United States Patent
Pieters et al.

(10) Patent No.: US 8,846,193 B2
(45) Date of Patent: Sep. 30, 2014

(54) COATED GLASS SHEET

(75) Inventors: Ronny Pieters, Jumet (BE); David Pierre, Jumet (DE)

(73) Assignee: AGC Glass Europe, Brussels (BE)

( * ) Notice: Subject to any disclaimer, the term of this patent is extended or adjusted under 35 U.S.C. 154(b) by 97 days.

(21) Appl. No.: 13/500,028

(22) PCT Filed: Oct. 29, 2010

(86) PCT No.: PCT/EP2010/066490
§ 371 (c)(1),
(2), (4) Date: Apr. 3, 2012

(87) PCT Pub. No.: WO2011/051459
PCT Pub. Date: May 5, 2011

(65) Prior Publication Data
US 2012/0196099 A1    Aug. 2, 2012

(30) Foreign Application Priority Data

Oct. 30, 2009  (EP) .................... 09174626

(51) Int. Cl.
| B32B 17/10 | (2006.01) |
| C05D 3/02 | (2006.01) |
| C03C 17/42 | (2006.01) |
| C03C 17/00 | (2006.01) |
| C03C 8/14 | (2006.01) |

(52) U.S. Cl.
CPC ............ *C03C 17/008* (2013.01); *C03C 17/42* (2013.01); *C03C 2218/31* (2013.01); *C03C 2218/355* (2013.01); *C03C 8/14* (2013.01)
USPC ........... 428/334; 428/325; 428/335; 428/412; 428/415; 428/417; 428/425.6; 428/429; 428/430; 428/431; 428/435; 428/436; 428/437; 428/441; 428/442; 427/389.7

(58) Field of Classification Search
USPC ............... 428/325, 334, 335, 412, 415, 417, 428/425.6, 429, 430, 431, 435, 436, 437, 428/441, 442
See application file for complete search history.

(56) References Cited

U.S. PATENT DOCUMENTS

| 2003/0119647 A1 | 6/2003 | Sanichi et al. ................. 501/17 |
| 2003/0129546 A1 | 7/2003 | Mitsui et al. ................. 430/320 |
| 2006/0189745 A1 | 8/2006 | Mitsui et al. ................. 524/494 |
| 2009/0004390 A1 | 1/2009 | Smith et al. ................ 427/372.2 |
| 2009/0208658 A1 | 8/2009 | Smith et al. ................ 427/383.5 |
| 2009/0220778 A1 | 9/2009 | Scarso et al. ................. 428/335 |

FOREIGN PATENT DOCUMENTS

| EP | 1 298 099 | 4/2003 |
| EP | 1 306 872 | 5/2003 |
| FR | 2 713 623 | 6/1995 |
| JP | 2001 354447 | 12/2001 |
| WO | 2007 104752 | 9/2007 |

OTHER PUBLICATIONS

International Search Report Issued Feb. 8, 2011 in PCT/EP10/66490 Filed Oct. 29, 2010.

*Primary Examiner* — Dhirajlal S Nakarani
(74) *Attorney, Agent, or Firm* — Oblon, Spivak, McClelland, Maier & Neustadt, L.L.P.

(57) ABSTRACT

Glass sheets according to the invention, in particular lacquered glass sheets, are covered with a coating of enamel. This coating comprises between 11 and 40% of organic material. Such glass sheets may be heat treated and, before heat treatment, may be handled and transported without damaging the coating, may be cut and ground without causing the coating to peel off or to be damaged at the borders of the cutting line, and offer a good resistance under running water, avoiding the peeling off or destruction of the coating during edges grinding or storage or transportation.

19 Claims, No Drawings

COATED GLASS SHEET

CROSS REFERENCE TO RELATED APPLICATION

This application is a 371 of PCT/EP2011/066490, filed on Oct. 29, 2010, and claims priority to European Patent Application No. 09174626.3, filed on Oct. 30, 2009.

The present invention relates to coated glass sheets, in particular glass sheets with a lacquer layer formed on a surface thereof, and to such glass sheets which are heat treatable and which may be handled before such possible heat treatment. By "lacquer layer" we mean herein paint, enamel, lacquer or other type of decorative coloured layers.

Glass sheets according to this invention may have various applications. Lacquered glass sheets may for example be used for decorative purpose, in furniture, wardrobes, as doors for furniture, as partitions, in tables, shelves, in bathrooms, in shops displays, as wall covering, in outdoor environments, and as spandrels. Such lacquer may also be used on automotive glazing panels, or at least on portions of these glazing, for example on the peripheral portions of windscreen. More and more of these applications necessitate tempered glass sheets as tempered glass sheets have the advantage of being more resistant to breakage. Other heat treatments are also becoming often used: bending, for example.

Conventionally, lacquered glass sheets may be produced according to various processes.

In one known process, a glass sheet is covered with a layer of organic based paint which is then dried and/or cured in an oven, for example at around 150° C. for about 10 minutes. The organic based paint may comprise, for example, a polyurethane resin, an alkyd resin, or an acrylic resin. Before applying the paint layer, the glass may be treated with a silane. When conventional lacquered glass sheets covered with a layer of organic based paint are heat treated at high temperature, the lacquer burns, is deteriorated or may be completely destroyed. Such conventional lacquered glass sheets will generally not survive temperatures higher than 200° C. without degradation. When the glass sheet is tempered before it is lacquered, this necessitates that the glass sheet be already in its final dimension, since cutting and grinding a tempered glass sheet is not possible. This does not allow mass and continuous production.

In another known process, a glass sheet is covered with a layer of IR or UV curable enamel, then cured, and finally heat treated at around 600° C. The curing step provides limited mechanical resistance (Clemen test result is less than 50 g) to the coated glass sheet to allow it to be handled on the manufacturing line until it reaches the oven where the heat treatment occurs. Nevertheless, the curing step does not give a mechanical and water resistance sufficient for the coated glass sheet to be resistant to transport, by truck for example, to be cut, to be edge worked or to be stocked, before the step of heat treatment. It is necessary for such conventional enamelled glass to be heat treated immediately after production and on the same production line.

More recently, lacquered glass sheets have been developed by providing on the glass sheets a coating comprising, in order, a first layer comprising an enamel and a second layer comprising a resin (WO2007104752). Such glass sheets may be handled and transported before heat treatment without damaging the coating; they may be cut and ground before heat treatment without causing the coating to peel off or to be damaged at the borders of the cutting line; furthermore they may offer, before heat treatment, a good resistance under running water. Generally speaking, the second layer is present temporarily, to give resistance to the lacquered glass sheet before heat treatment; it is intended to be removed or destroyed after heat treatment. Nevertheless, although this two layers system may offer good resistance to scratches before heat treatment, we have noticed that, during the manufacturing process, the resistance of the first layer before the deposition of the second layer could be poor and that handling tools, like conveyor's rollers or suckers, could damage the first layer before its protection by the second layer, leading to defects in the final product.

Unless otherwise indicated, references to temperatures herein are references to oven temperatures, i.e. atmosphere temperatures, in which heating or heat treatment occurs. By "heat treatment", it is intended a bending and/or thermal tempering and/or thermal hardening operation and/or other comparable heating process. Such heat treatment may involve heating or exposing the glass sheet carrying the lacquer to a temperature greater than about 560° C. and, for example, between 560° C. and 750° C. in the atmosphere, for between 2 minutes and 20 minutes, preferably for maximum 15 minutes, depending on the thickness of the glass sheet and the oven used. The term "heat treated glass sheet" as used herein means that the glass sheet has undergone a heat treatment. By curing, it is intended a step which allows a liquid paint, lacquer or enamel coating to harden. Curing generally involves at least drying (solvent evaporation) but may also involve chemical reactions like cross-linking of polymer chains.

According to one aspect, the present invention provides a glass sheet having a coating of enamel provided on at least one surface of said glass sheet. Advantageously, the coating of enamel according to the invention comprises between 11 and 40% of organic material.

Such increased content of organic material in the coating of enamel may provide advantageous mechanical resistance properties before heat treatment. Glass sheets according to the invention may be handled with common handling tools (e.g. rollers, suckers) and transported before heat treatment without damaging the coating, for example without creating scratches. They may be cut and ground before heat treatment without causing the coating to peel off or to be damaged at the borders of the cutting line. Additionally, they may offer, before heat treatment, a good resistance under running water avoiding the peeling off or destruction of the coating when, for example, washing the glass sheets or edge working. Furthermore, these properties may be reached with a single layer coated on the glass sheets, which may be easier, cheaper and less time-consuming than previous known processes necessitating two layers.

Moreover, the inventors have surprisingly found that coating compositions according to the invention may be cured at lower temperatures and/or more rapidly than previous known coatings for lacquered glass sheets.

The present invention has particular advantages in relation to heat treatable lacquered glass sheets. The term "heat treatable glass sheet" as used herein means that the lacquered glass sheet according to the invention is adapted to undergo a heat treatment without creating defects (e.g. aesthetical defects in the lacquer) and having still a good adhesion between the glass sheet and the lacquer.

Preferably, the coating of enamel according to the invention comprises between 11 and 25% of organic material. Such upper limit of organic material in the coating of enamel allows avoiding the so-called "stardust" phenomenon which may be observed on a painted glass by light transmittance. It manifests itself when a paint coating is not fully homogeneous and shows some (microscopic) holes. These holes allow the light crossing the coating, and therefore being visible when looking from the glass side, showing small light points.

In order to measure such content of organic material, a quantity (generally of the order of 1 to 2 grams) of the coating material scraped from a cured but non heat-treated coated glass sheet is analysed by thermogravimetric analysis (TGA). The TGA is conducted in air, from 20 to 1000° C., with a temperature increase of 10° C./min. The content of organic material is determined by quantification of the material (exempt of possible residual solvents) which burns during the TGA, until no more weight loss is observed. Generally, the organic material is totally burned when reaching 500° C.

Glass sheets according to present invention, not heat treated or once heat treated, may furthermore advantageously offer similar properties to conventional non heat treatable lacquered glass sheets in terms of adhesion of the coating to the glass, chemical resistance, mechanical resistance and glue resistance. In particular, a non heat treated or a heat treated glass sheet according to the present invention may present one or more of the following properties:

| | |
|---|---|
| Opacity | Luminous transmittance <5%, preferably <1%, more preferably <0.1% |
| Abrasion test (1000 revolutions) | at most 20% of the coating (as herein defined) is removed, preferably at most 18% or at most 17%. |
| Clemen test (according to ISO 1518-1992) | No visible scratch on the painted side, at 700 g, preferably at 800 or 900 g, more preferably at 1000 g |
| Persoz pendulum (according to ISO 1522-1998) | at least 170 s., preferably at least 180 s. |
| UV test (according to standard ASTM G53-88, without water, at 60° C., by continuous irradiation UVA 340 nm) | No colour change ($\Delta E^* <2$) after 1000 h - 300 W |
| Condensation test (according to standard DIN 50 017/40° C./98% relative humidity/20 days) | No blistering No colour change ($\Delta E^* <2$) |
| Glue resistance (in humid atmosphere at 35° C. - glass samples with blobs of glue on the coated side, during 20 days) | No marks of glues visible on the glass side with acetic, alkoxy and oxime glues Good adhesion, no separation |

The abrasion test, Clemen test, Persoz test, the UV test and the condensation test are all described hereunder.

According to the invention, a coating of enamel is provided on at least one surface of said glass sheet. The term "enamel" is used herein equally for an enamel composition before any curing or heat treatment, or an enamel composition which is dried or cured but not yet sinterised. An enamel generally comprises pigments and a glass frit. An enamel also generally comprises a medium. The medium ensures that the solid particles are in correct suspension and allows application and temporary adhesion of the enamel to the substrate. The medium is preferably organic. Examples of enamels to be adapted for the coating of the present invention are enamel 144001 black 801029 from the company FERRO, enamel AF2600-65-96 from the company JOHNSON MATTHEY and enamel TEMPVER bianco 3400-06-011 or 3400-147A from the company FENZI.

According to the invention, the coating comprises between 11 and 40% of organic material. This organic material may come from the initial medium of a commercial enamel wherein is added additional organic compounds in order to reach the desired amount of organic material in the coating. Alternatively, the coating of enamel from the invention may be prepared by mixing, amongst others, a glass frit, pigments and organic compounds to obtain a coating of enamel with the desired amount of organic material.

Preferably the organic material, after curing, has a softening temperature of at least 20° C., preferably at least 25, 30, 35 or 40° C. Such values may further help provide advantageous mechanical resistance properties before heat treatment. This softening temperature may equal to Tg (glass transition temperature) in the case where the organic material consists essentially of polymers, or to the melting point if other compounds are present. Such values of softening temperatures may ensure that the coating, before curing and at usual temperatures involved during the manufacturing process, is not too soft, which would otherwise create scratches in the coating very easily.

Preferably, the organic material of the coating, i.e. once cured, comprises, or still more preferably consists essentially of, at least one material selected from the group consisting of polyols, alkyds, acrylic, polyacrylic, polyacrylates, polymethacrylates, acrylamides, melamine, polycarbonates, acrylic-styrenes, vinyl-acrylic, urethanes, polyurethanes, polyesters, polyolefines, urethane alkyds, polyurea, amino resins, polyamides, epoxies, epoxy esters, phenolic resins, silicon resins, PVC, PVB, water-based resins and reaction products of photocurable chemicals. The organic material of the coating may also advantageously comprise classical paint additives such as dispersing agent, leveling agent, flowing agent, anti-UV agent, catalysts, wetting agent, adhesion promoter, matting agent and/or structuring agent. More preferably, the organic material of the coating comprises a polyol and melamine.

The thickness of the coating, once dried and/or cured but before heat treatment, is of at least 10 µm and it is at most 150 µm. Preferably, the thickness of the coating is of at least 15 µm and it is at most 100 µm. If the thickness of the coating is too low, it may not adequately form a lacquered glass sheet with the required mechanical and water resistance properties; if it is too high, the curing may not be good and detachments may occur. Such thicknesses may be reached, during the manufacturing process, by one or more coating applications. References to layers thicknesses herein are references to the mean geometrical thickness of the layer.

Preferably, the coating is in direct contact with the glass substrate. The glass substrate may be surface-treated, before coating, with an adhesion promoter to improve the adhesion of the coating to the glass, without departing from this embodiment. This adhesion promoter may comprise silane.

In still other embodiments, a continuous layer may be present between the coating and the glass sheet. Such preferred structures may provide particularly good mechanical resistance properties for transportation, for cutting and grinding, and for resistance under running water prior to any heat treatment. In this embodiment, the glass substrate may also be surface-treated, before any coating, with an adhesion promoter to improve the adhesion of the first coating to the glass.

In a preferred embodiment, the coating of the invention may be continuous and extend over substantially the whole surface of the glass sheet, i.e. over more than 90% of the surface of the glass sheet, preferably over more than 95% of the surface of the glass sheet.

For decorative purposes, the coating may be coloured. If the glass sheet is heat treated, colour may change during heat treatment, depending on the composition of the coating. If this occurs, this should be taken into account on the heat treatable product, to ensure that the final colour, after heat treatment, is as desired. Alternatively, if the glass sheet is heat treated, colour may not change during heat treatment.

For decorative purposes, the coating may be opaque or translucent. It may also be structured or matted.

The substrate used may be flat glass, in particular float glass of various thicknesses (between 1.8 and 10.2 mm, for example); it may be soda lime glass and may be clear, extra-clear, coloured, etched or sand-blasted glass. Glass sheets according to the invention may have a size greater than 1 m×1 m. They may have sizes, known as PLF, of for example 3.21 m×6 m or 3.21 m×5.50 m or 3.21 m×5.10 m or 3.21 m×4.50 m or sizes, known as DLF, of for example 3.21 m×2.50 m or 3.21 m×2.25 m. Although the present invention has mainly been described in relation with glass substrates, it may also be applied to metallic substrates or plastic substrates.

According to some embodiments, the present coated glass sheet may comprise an additional coating, coated above the coating of enamel, further from the glass substrate. This may help still increase the mechanical resistance of the lacquered glass sheet. Such additional coating layer may be of the type of the second layer described in WO2007104752, i.e. a layer comprising a resin and optionally, fillers of enamels. This resin may comprise at least one material of the group consisting of photocurable chemicals, polyester resins, alkyds, acrylic, acrylamide, acrylic-styrene, vinyl-acrylic, urethane, polyurethane, polyester, urethane alkyds, amino resins, polyamide, epoxy, epoxy ester, phenolic resins, silicon resins, PVC, PVB, and water-based resins. Such additional coating layer may have, once cured, a thickness in the range 5 to 50 µm.

According to another aspect, the present invention provides a method for manufacturing heat treatable lacquered glass sheets comprising the following steps, in the order recited:
  providing a glass sheet;
  applying a coating of enamel comprising between 11 and 40% of organic material, expressed in weight percentage, on at least one surface of the glass sheet; and
  curing the coating so that enamel is hardened and sticks to glass but is not yet fused or sinterised.

Curing of the coating may be implemented by temperature, UV, IR or NIR radiations, by electron beam, and/or by induction heating.

When considering curing under IR radiations, preferably, the coating is cured at a temperature of at least 150° C. or at least 175° C. and/or not exceeding 300° C., preferably not exceeding 275° C.; this may take around 1 to 20 minutes, preferably 2 to 15 minutes (in a static oven); or, in an industrial oven, this may take around 5 to 10 minutes with a maximum temperature measured on the glass of around 200-250° C. When considering curing by electron beam, this may require at least 40 keV. When considering curing by UV, this may require at least 250 mJ/m$^2$.

The coating may be applied by any method known in the art, for example the processes of roller coating or curtain coating, the spray process or flow process. The screen printing method may also be used, especially if only portions of the glass sheet are to be coated.

When a glass sheet according to the present invention is heat treated, the coating fuses and sinterises, and the organic material burns. Sintering may occur at temperatures of around 600-700° C. or above.

Preferably, a glass sheet according to the invention, once thermally tempered or toughened may be used as safety glass in buildings, in accordance with the standard EN12150-1:2000. Preferably, a glass sheet according to the invention, once thermally tempered or toughened breaks according to the fragmentation test of standard prEN14-179-1:2001 or EN1863-1:2000.

Embodiments of the invention will now be further described, by way of examples only, together with some comparative examples, not in accordance with the invention. Table I summarises all the examples and comparative examples.

EXAMPLES 1 TO 17

Various mixtures comprising commercially available enamels and commercially available paints are manufactured. The paint is added to provide to the enamel an increased content of organic material, according to the invention.

The enamels used in all examples 1 to 17 are identified in Table I. White enamel TEMPVER bianco 3400-147A from the company FENZI, for example, comprises around 75 Wt % of frit and around 25 Wt % of organic material (polyacrylic resin and plasticiser).

In examples 1-3, 7-11 and 16-17, GLASSOREX paints from the company FENZI were used, with various colours defined according to the RAL system. Those paints generally comprise around pigments, solvents, a methacrylic resin, a melamine resin and an epoxy resin. In examples 4-5 and 12-15, a clearcoat including an anti-UV additive, from the company FENZI, was used; in example 6, the clearcoat did not comprise the anti-UV additive. The clearcoat also comprises methacrylic resin, melamine resin and epoxy resin.

The enamels and the paints were mixed according to various proportions given in columns 2 and 4 of Table I. In some examples the quantity of organic material measured by TGA is given in Wt % (column 6 of Table I).

Sheets of float glass having a thickness of 4 mm are conveyed along a path by a roller conveyor. They are first washed in the normal manner. They then pass under a curtain coater where they are covered with a mixture comprising a commercial enamel and a paint. Different mixtures have been used for each example, as set out in columns 2 to 6 of Table I and explained hereinabove. The coating was then cured at moderated temperature, according to the parameters set out in column 9 of Table I.

Thicknesses of the coating, once cured and before heat treatment, are given in column 7 of Table I. The products, after curing but before heat treatment (columns 10 to 12 of Table I), show a water resistance under running water which is good. Adherence of the coating to the glass is good; this may allow good grinding without defects on the edges. Persoz and Clemen results are good. There is not too much of the coating which is removed after an abrasion test of 1000 revolutions, indicating that such coating may resist to handling and transportation.

The products have resisted to heat treatment and have shown, after heat treatment (180 seconds at 680° C.), good Persoz results (columns 13 of Table I).

COMPARATIVE EXAMPLES 1-3

In comparative examples 1 to 3, the coating consists only of the enamel and the content of organic material is below 11%. Resistance of such coating before heat treatment is much lower: no resistance to Abrasion test and Persoz and Clemen results are lower. Their resistance under running water is not acceptable, edge working is not possible, and unacceptable scratches appear during handling and/or transportation.

COMPARATIVE EXAMPLES 4 AND 5

In comparative examples 4 and 5, the coating does not include an enamel; the coating consists solely of the pigmented paint. The content of organic material in the coating is above 40%. Such coating has good resistance under water, to edge working or to scratches, but is not heat treatable. The coating is hardly damaged.

EXAMPLES 18 TO 28

Various coated and cured glasses according to the first set of examples were coated with an additional coating layer by passing under a curtain coater where a polyurethane paint from the company FENZI including around 50% by weight of fillers of enamel is applied on the first coating comprising the enamel and the paint. This second coating is dried directly after the application, during around 20 minutes at 200° C.

Thicknesses of this additional layer, once cured and before heat treatment of the product, are given at column 8 in Table I. The products, once cured and before heat treatment show enhanced resistance (columns 10 to 12 of Table I), compared to products with a single coating comprising an enamel and a paint.

COMPARATIVE EXAMPLE 6

This comparative example corresponds to a product according to WO2007104752. Although resistance of the 2-layers product before heat treatment is good, resistance of the first coating, before it is covered with the second protective coating is not enough: scratches may appear during handling on the manufacturing line.

Tests

The Abrasion test may be used to predict the behaviour of lacquered glass sheets according to the invention when edge machined, transported, washed and/or heat treated. A 10×10 cm square sample is maintained on a steel plate rotating at a speed of 65 to 75 rpm. Each of two parallel weighted arms carries one specific abrasive small wheel (CS10F) rotating freely around a horizontal axis. Each wheel lies on the sample to be tested under the weight applied to each arm, which is a mass of 500 g. The combination of the abrasive wheels and the rotating supporting plate creates on the sample an abrasive crown, more or less important according to the coating hardness.

The quantity of coating which is removed after having submitted the coated glass sheet to 1000 revolutions in a Abrasion test as herein defined is calculated as follows:

The weight of a coated glass sheet is measured: Wtpainted glass.
The weight of an identical glass sheet which is not coated is also measured: Wtglass.
The weight of the coating itself is then calculated: Wtpaint=Wtpainted glass−Wtglass.
A "paint ratio" P.R.=may also be calculated; in preferred embodiments of the present invention the paint ratio may be around 1 to 2 Wt %.

a 10 cm×10 cm square sample of such a coated glass sheet is then provided and weighted: Wtpainted sample.
the same sample is then weighted after having been submitted to a Abrasion test of 1000 revolutions with two wheels CS10 loaded with 500 g each: Wttested sample. The coating is removed according to an abrasion crown (i.e. a 2-D donut shape).
the quantity of coating which is removed may then be calculated:

The maximum coating quantity which may be removed is approximately 25%. This is due to the size of the abraded crown surface on a 10×10 cm square sample and the paint ratio generally applied.

The glass thickness of the tested samples must be the same than the glass thickness used in the calculation of the P.R.

The Clemen test is used to evaluate the scratch resistance of the coating. A tungsten carbide tipped needle is pressed onto the coating by applying a load on the needle. The needle is used to scratch the coating over a distance of about 60 mm. Several weights (from 250 g till 2500 g with an interval of 250 g) may be applied on the same sample with a certain distance between each of the scratches. Hence a series of parallel scratches may be made into the sample. Full details of this test are set out in International Standard ISO 1518-1992.

The UV test is used to simulate the deterioration caused by sunlight. Full details of this test are set out in ASTM Standard G53-88. Samples are exposed to ultraviolet light. The exposure conditions used herein are: UVA lamp at 340 nm; power of UV lamp: 300 W; timing of the UV exposure: 1000 hours; temperature of UV exposure: 60° C.; no condensation exposure was performed. No colour change should appear after the test, preferably the variation of colour $\Delta E^*$ should be less than 2. $\Delta E^*$ is calculated as follows: $\Delta E^* = \sqrt{(\Delta L^{*2} + \Delta a^{*2} + \Delta b^{*2})}$ where $L^*$ $a^*$ $b^*$ are measured on the CIElab scale.

The condensation test is used to assess the behaviour of the sample in humid ambient atmospheres and to pinpoint any defects of the protection of the samples against corrosion. Full details of this test are set out in the standard DIN50 017. The conditions used herein are: 98% relative humidity; temperature of 40° C.; during 20 days. No blistering, i.e. local peeling off of the lacquer, should be visible after the test.

The coating hardness may be measured with a Persoz pendulum. The samples are conditioned at a temperature of 20° C. during at least 24 hours prior to the hardness measurement. The pendulum hardness test is based on the principle that the amplitude of the pendulum's oscillation will decrease more quickly when supported on a softer surface. The Persoz test measures the time for the amplitude to decrease from 12° to 4°. Full details of this test are set out in International Standard ISO 1522-1998.

TABLE I

| | Coating composition | | | | Coating | additional layer | | after curing and before heat treatment | | | after heat treatment (180 sec, 680° C.) |
|---|---|---|---|---|---|---|---|---|---|---|---|
| Ex. | Enamel | | Paint added to provide increased organic content | organic content [Wt %] | thickness [µm] | thickness [µm] | curing | coating removed after Taber 1000r | Persoz [sec.] | Clemen [g] | Persoz [sec.] |
| 1 | 90% | white | 10% | RAL1015 | | 55 | — | 20 min 250° C. | | 198 | 950 | 407 |
| 2 | 90% | white | 10% | RAL 9010 | | 60 | — | 20 min 250° C. | | 175 | 700 | 443 |
| 3 | 90% | white | 10% | RAL 9003 | | 65 | — | 20 min 250° C. | | 178 | 750 | 440 |

TABLE I-continued

| Ex. | Coating composition — Enamel | | Paint added to provide increased organic content | organic content [Wt %] | Coating thickness [μm] | additional layer thickness [μm] | curing | after curing and before heat treatment — coating removed after Taber 1000r | Persoz [sec.] | Clemen [g] | after heat treatment (180 sec, 680° C.) Persoz [sec.] |
|---|---|---|---|---|---|---|---|---|---|---|---|
| 4 | 90% | white | 10% | clear + antiUV | | 65 | — | 20 min 250° C. | | 178 | 650 | 438 |
| 5 | 90% | grey | 10% | clear + antiUV | 11.9 | 53 | — | 8 min 200° C. | 19% | 174 | — | — |
| 6 | 90% | white | 10% | clear | | 52 | — | 20 min 250° C. | | 192 | 700 | 438 |
| 7 | 75% | white | 25% | RAL1015 | | 32 | — | 20 min 250° C. | | 212 | 950 | — |
| 8 | 75% | white | 25% | RAL1015 | | 55 | — | 20 min 250° C. | | 187 | 1050 | 371 |
| 9 | 75% | white | 25% | RAL 9003 | 13.5 | 57 | — | 20 min 250° C. | | 196 | 850 | 434 |
| 10 | 75% | white | 25% | RAL 9003 | | 57 | — | 10 min 250° C. | | 196 | 650 | 420 |
| 11 | 75% | white | 25% | RAL 9003 | 16.6 | 57 | — | 20 min 250° C. | | 195 | 650 | 438 |
| 12 | 75% | white | 25% | clear + antiUV | | 58 | — | 20 min 250° C. | 4.8% | 191 | 850 | 446 |
| 13 | 75% | white | 25% | clear + antiUV | 17.2 | 50 | — | 20 min 250° C. | 9.4% | 183 | 900 | 434 |
| 14 | 75% | black° | 25% | clear + antiUV | 13.6 | 50 | — | 20 min 250° C. | 20.0% | 160 | — | — |
| 15 | 75% | grey | 25% | clear + antiUV | | 53 | — | 8 min 200° C. | 6.9% | 186 | — | — |
| 16 | 50% | white | 50% | RAL 9003 | | 50 | — | 20 min 250° C. | | 241 | 1100 | 381 |
| 17 | 50% | white | 50% | RAL 9003 | | 50 | — | 10 min 250° C. | | 233 | 1000 | 380 |
| Comp 1 | 100% | white | — | — | 9.3 | 55 | — | 20 min 250° C. | 25%, i.e. totally removed after 600r | 163* | 450* | 433 |
| Comp 2 | 100% | black[1] | — | — | 5.45 | 48 | — | 20 min 200° C. | | * | * | — |
| Comp 3 | 100% | black[1] | — | — | 4.6 | 51 | — | 20 min 200° C. | 25%, i.e. totally removed after 500r | 120* | * | — |
| Comp 4 | — | — | 100% | RAL1015 | | 40 | — | 10 min 180° C. | | 233 | 1450 | not heat treatable |
| Comp 5 | — | — | 100% | RAL 9003 | 50.1 | 45 | — | 10 min 180° C. | | — | — | not heat treatable |
| 18 | 90% | white | 10% | RAL1015 | | 55 | 17 | | | 221 | 1500 | — |
| 19 | 90% | white | 10% | clear + antiUV | | 65 | 13 | | | 193 | 1800 | 435 |
| 20 | 90% | white | 10% | clear | | 52 | 23 | | | 207 | 1700 | 440 |
| 21 | 75% | white | 25% | RAL1015 | | 55 | 20 | | | 196 | 1700 | — |
| 22 | 90% | white | 10% | RAL 9010 | | 60 | ~20 | | | 192 | 1900 | 384 |
| 23 | 90% | white | 10% | RAL 9003 | | 65 | ~20 | | | 198 | 1900 | 403 |
| 24 | 75% | white | 25% | RAL 9003 | | 57 | ~20 | | | 213 | 1950 | 380 |
| 25 | 75% | white | 25% | RAL 9003 | | 57 | ~20 | | | 218 | 2300 | 330 |
| 26 | 75% | white | 25% | RAL 9003 | | 57 | ~20 | | | 195 | 2000 | 378 |
| 27 | 75% | white | 25% | clear + antiUV | | 58 | 14 | | | 220 | 1600 | 461 |
| 28 | 75% | white | 25% | clear + antiUV | | 50 | 18 | | | 210 | 1500 | 456 |
| Comp 6 | 100% | white | — | — | | 53 | 22 | | | 205 | 1400 | 436 | white enamel = enamel TEMPVER Bianco 3400-147A from the company FENZI
black° enamel = enamel 144001 black 801029 from the company FERRO
black[1] enamel = enamel TEMPVER Nero 3400-990A from the company FENZI
grey enamel = enamel TEMPVER Grigio 3400-7077A from the company FENZI
*resistance under running water and edges working not OK

The invention claimed is:

1. A glass sheet, comprising, on a surface, a coating of a cured enamel,
wherein the cured enamel comprises between 11 and 25 wt % of an organic material, based on a total weight of the coating, and
wherein the coating is in direct contact with the glass sheet.

2. The glass sheet of claim 1, wherein the cured enamel comprises a pigment and a glass frit.

3. The glass sheet of claim 1, wherein the organic material comprises at least one material selected from the group consisting of a polyol, an alkyd, an acrylic, a polyacrylic, a polyacrylate, a polymethacrylate, an acrylamide, melamine, a polycarbonate, an acrylic-styrene, vinylacrylic, a urethane, a polyurethane, a polyester, a polyolefin, a urethane alkyd, a polyurea, an amino resin, a polyamide, an epoxy, an epoxy ester, a phenolic resin, a silicon resin, PVC, PVB, a water-based resin, and a reaction product of photocurable chemical.

4. The glass sheet of claim 3, wherein the organic material of comprises a polyol and melamine.

5. The glass sheet of claim 1, wherein a thickness of the coating is in a range from 10 to 150 μm.

6. The glass sheet of claim 5, wherein the thickness of the coating is in a range from 15 to 100 μm.

7. The glass sheet of claim 1, wherein the coating extends over substantially the whole surface of the glass sheet.

8. The glass sheet of claim 7, wherein the coating covers more than 90% of the surface of the glass sheet.

9. The glass sheet of claim 8, wherein the coating covers more than 95% of the surface of the glass sheet.

10. The glass sheet of claim 1, further comprising:
an adhesion promoter at the surface of the glass sheet.

11. The glass sheet of claim 10, wherein the adhesion promoter comprises silane.

12. The glass sheet of claim 1, further comprising:
an additional coating above the coating of the enamel, which is further from the surface of the glass sheet.

13. The glass sheet of claim 12, wherein the additional coating comprises at least one material of the group consisting of a photocurable chemical, a polyester resin, an alkyd, an acrylic, an acrylamide, an acrylic-styrene, a vinyl-acrylic, a urethane, a polyurethane, a polyester, a urethane alkyd, an amino resin, a polyamide, an epoxy, an epoxy ester, a phenolic resin, a silicon resin, PVC, PVB, and a water-based resin.

14. The glass sheet of claim 13, wherein a thickness of the additional coating layer is in a range 5 to 50 μm.

15. The glass sheet of claim 1, which is heat treatable.

16. The glass sheet of claim 1, wherein the organic material has a softening temperature of at least 20° C.

17. The glass sheet of claim 16, wherein the organic material has a softening temperature of at least 25° C.

18. The glass sheet of claim 17, wherein the organic material has a softening temperature of at least 30° C.

19. A method for manufacturing a heat treatable lacquered glass sheet, the method comprising:
   (I) applying a coating of enamel comprising between 11 and 40 wt % of an organic material, based on a total weight of the coating, on a surface of a glass sheet; and then
   (II) curing the coating, thereby hardening the enamel and obtaining the heat treatable lacquered glass sheet,
   wherein, after the curing, the enamel sticks to the surface of the glass sheet but is not yet fused or sinterised.

* * * * *